United States Patent Office 3,478,505
Patented Nov. 18, 1969

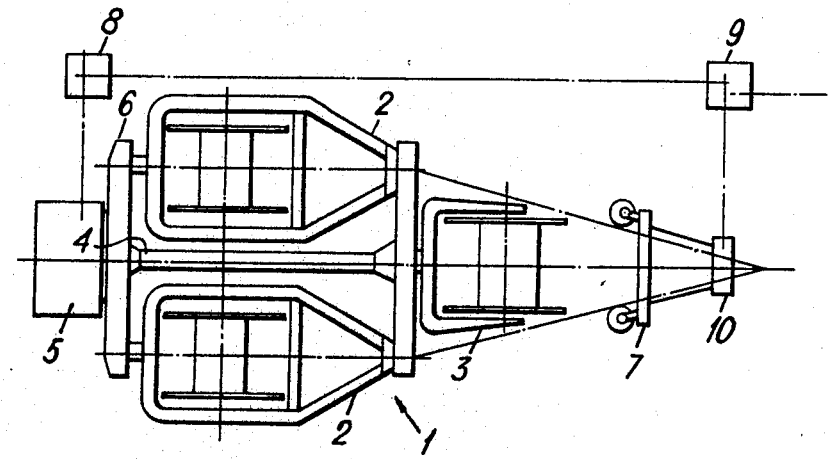
Inventors
AMUND BRAATEN
WILLY WILHELMSEN
By Edward Goldberg
Attorney

3,478,505
CABLE WINDING MACHINE
Amund Braaten, Oslo, and Willy Wilhelmsen, Snaroya, Norway, assignors to International Standard Electric Corporation, New York, N.Y., a corporation of Delaware
Filed Dec. 11, 1967, Ser. No. 689,696
Int. Cl. D01h 7/90, 7/02; D07b 3/02
U.S. Cl. 57—59     3 Claims

ABSTRACT OF THE DISCLOSURE

A rotatable carriage for a cable winding machine includes four cradles and payoff reels, three of which are arranged symmetrically about a central axis and the fourth is positioned between outlets of the other three and the laying-up point at which the conductors are brought together. A filler material reel is mounted on a separate carriage adjacent the laying-up point.

BACKGROUND OF THE INVENTION

Field of the invention

The present invention relates to a cable winding machine for laying up three or four conductor cores and filler material into a cable and comprises a rotatable carriage with four cradles for payoff reels, the cradles being mounted parallel to the axis of the machine.

Description of the prior art

In conventional machines for laying up three or four cores into a cable, the fourth cradle is generally arranged at the rear end of the machine while the three other cradles are symmetrically arranged in a carriage. Such machines, however, require large floor space. Other conventional machines have a plurality of cradles mounted in one carriage with their axis parallel to the machine axis, while filler material reels are mounted on the same carriage in the space between the cradles and the laying-up point. It is not considered practical however, to arrange four large cradles symmetrically, spaced by 90°, in one carriage, as the diameter of the machine will then be unnecessarily large. It is also not practical to have the filler material reels and the core cradles arranged on the same carriage, as exchanging of reels will be difficult.

SUMMARY OF THE INVENTION

It is therefore the primary object of the present invention to provide a more compact efficient cable winding machine requiring reduced space and permitting changing of filler material reels with minimum effects of weight variation.

These results are achieved by mounting one of the cradles in a space defined by lines from the laying-up point of the cable to the outlet from each of the other three cradles which are mounted between two bearing frames, these cradles being symmetrically spaced by 120° as in a conventional machine, and the filler material reels are mounted in a rotatable frame separate from the carriage in which the cradles are mounted.

In this arrangement, the machine utilizes the smallest possible floor space, as the space between the carriage and the laying-up point is used for both the fourth cradle and a filler material reel frame. A further advantage is that when the filler material reels are mounted in a separate frame, exchanging of reels is facilitated and the varying weight of the filler material reels have no influence on the balancing of the core reel carriage. The above mentioned and other features of the present invention will be more apparent from the following detailed description, taken in conjunction with the drawing.

BRIEF DESCRIPTION OF THE DRAWINGS

The figure shows a schematic arrangement of the cradles, reels and driving mechanism of the novel cable winding device.

DESCRIPTION OF THE PREFERRED EMBODIMENT

As shown in the figure, a cable winding machine mounted on a suitable support structure, not shown, includes a carriage 1 having two bearing frames between which are mounted three cradles 2, only tow being shown, symmetrically arranged about a central axis and spaced by 120°.

A fourth fork-shaped cradle 3 is mounted on the outside of the carriage on the bearing frame including the outlets of the other three cradles. The driving arrangement for cradle 3 is provided by an axle not shown, within a centrally arranged interconnecting tube 4, and which is connected to a gear box 5. The cradles 2 are driven by the gear box 5, via gears included in a bearing frame 6. A suitable motor and driving arrangement, not shown, are connected to gear box 5. A filler material reel frame 7 is driven in synchronism with the carriage 1, via suitably interconnected gear boxes 8, 9 and 10. The cradles contain reels of conductors which are fed with the filler material to a common laying-up point for winding into a cable. Cradle 3 is positioned in the space between the outlets of cradles 2 and the laying-up point, with the filler reel mounted on frame 7 in the space between cradle 3 and that point.

While only a single embodiment has been illustrated, it is to be understood that the invention is not limited to the exact form shown and that other variations may be made in the particular configuration without departing from the scope of the invention.

What is claimed is:
1. A cable winding machine for laying up a plurality of conductors and filler material into a cable comprising a rotatable carriage having two bearing frames, four cradles including conductor payoff reels mounted on said carriage, said cradles being mounted parallel to the axis of the machine, three of said cradles being mounted between said two bearing frames and symmetrically spaced about a central axis, the fourth of said cradles being mounted on the outside of one of said bearing frames in a space defined by lines from the outlet from each of said three cradles through said one bearing frame to the laying-up point at which said conductors and filler are brought together, and a filler material reel mounted adjacent said point in a rotatable frame separate from said carriage.
2. A cable winding machine according to claim 1, wherein said fourth cradle is fork-shaped and is mounted centrally on said one bearing frame.
3. A cable winding machine according to claim 2 wherein said filler material reel is mounted in the space between said fourth cradle and said laying-up point.

References Cited

UNITED STATES PATENTS

| | | | |
|---|---|---|---|
| 477,784 | 6/1892 | Sisum | 57—58.32 |
| 2,360,783 | 10/1944 | MacCreadie | 57—13 |
| 2,857,731 | 10/1958 | Simcoe | 57—64 |

FOREIGN PATENTS 652,657   2/1930   Germany.

MERVIN STEIN, Primary Examiner
WERNER H. SCHROEDER, Assistant Examiner

U.S. Cl. X.R.
57—13, 58.32